United States Patent [19]

Nagato et al.

[11] Patent Number: 4,806,839
[45] Date of Patent: Feb. 21, 1989

[54] DEVICE FOR ENERGIZING A HERMETIC MOTOR USING INVERTER

[75] Inventors: Yuichiro Nagato; Hiroshi Hujii; Osamu Matsumoto, all of Chiba; Katsuhiko Saito, Funabashi, all of Japan

[73] Assignee: Hitachi, Ltd., Tokyo, Japan

[21] Appl. No.: 63,478

[22] Filed: Jun. 18, 1987

[30] Foreign Application Priority Data

Jun. 25, 1986 [JP] Japan ................... 61-146857

[51] Int. Cl.$^4$ ............................... H02H 7/08
[52] U.S. Cl. .................... 318/798; 318/778; 361/22; 361/26
[58] Field of Search ............... 318/778, 798, 805, 806; 361/22, 24, 26, 27, 31, 32

[56] References Cited

U.S. PATENT DOCUMENTS 3,603,856  9/1971  Zalar et al. ................... 318/798
4,689,542  8/1987  Ibori et al. ................... 318/798

FOREIGN PATENT DOCUMENTS 56-793  9/1981  Japan .

*Primary Examiner*—David Smith, Jr.
*Attorney, Agent, or Firm*—Fay, Sharpe, Beall, Fagan, Minnich & McKee

[57] ABSTRACT

A hermetic box contains a motor and a self reset type protector which interrupts the supply of electric power to the motor when an abnormally heated condition takes place in the hermetic box and automatically supplies again the electric power when the abnormally heated condition ceases. The motor is energized by an inverter having AC output terminals connected to the motor outside of the hermetic box. A current detector which detects that no current is flowing into the motor is provided on the output side of the inverter outside for a hermetic box. Provision is further made of speed setter for setting the speed of the motor, a lump circuit which receives the output of the speed setting and produces a signal obtained by loosening the sudden change of the output of the speed setting, inverter output control which so controls the inverter that it produces an output voltage and an output frequency depending upon the output of the lump circuit, and a reset circuit which decreases the output of the lump circuit when the current detector has detected that no current is flowing into the motor.

6 Claims, 3 Drawing Sheets

DEVICE FOR ENERGIZING A HERMETIC MOTOR USING INVERTER

BACKGROUND OF THE INVENTION

1. Field of the Invention

The present invention relates to a device for energizing, using an inverter, a motor contained in a hermetic box which contains the motor and self reset type protecting device which interrupts the supply of electric power to the motor in case of an abnormal condition.

2. Description of the Prior Art

A compressor for air conditioning has been designed to be capable of finely adjusting the temperature yet contributing to saving energy. For this purpose, therefore, it is accepted practice to energize the motor for driving the compressor using a frequency-variable inverter.

The U.L. Standards state that the motor for driving the compressor be contained in a hermetic box filled with a cooling medium together with self reset type protecting device which interrupts the supply of electric power to the motor in case the motor is abnormally heated or is just going to be heated abnormally.

A known device for energizing a hermetic motor has been disclosed in Japanese Patent Laid-Open No. 46150/1978. A method has also been known to apply to the electric motor an electric power starting from a low frequency and a small output to suppress the starting current at the time of re-starting the inverter.

SUMMARY OF THE INVENTION

In the devices proposed thus far, self reset type protecting device works to interrupt the supply of electric power to the motor and is then reset automatically, so that the motor is served with the output voltage of the inverter having a magnitude equal to that of just before the power supply was interrupted. Therefore, a heavy current flows into the inverter causing the inverter protecting device to be actuated undesirably.

The present invention was achieved under such circumstances, and its object is to provide a device for energizing a hermetic motor, which is capable of re-starting the motor while suppressing the load current of the inverter when a self reset type protection device is automatically reset, the self reset type protecting device being contained in a hermetic box together with the motor.

Another object of the present invention is to provide a device for energizing a hermetic motor which is capable of achieving the aforementioned object by simply drawing lead wires from the hermetic box in a number required for energizing the motor.

To reduce the number of lead wires drawn from the hermetic box is important from the standpoint of maintaining air-tightness of the hermetic box.

That is, according to the device for energizing a hermetic motor of the present invention, the motor is energized by an inverter, the motor being contained in a hermetic box together with self reset type protecting device which interrupts the supply of electric power to the motor during an abnormal condition, wherein provision is made of current detection that detects that no current is flowing into the motor due to the action of the reset type protection device, and output control that controls the output of the inverter upon receipt of the output of the current detector, the current detector and the output control being provided on the output side of the inverter outside of the hermetic box.

It is desired that the output control is so constituted that when the current detector has detected the action of the reset type protecting device, the output voltage and the output frequency of the inverter are decreased and, then, the output voltage and the output frequency are gradually increased. Here, however, the output frequency may be maintained under the condition of when the reset type protection occurred, and the output voltage only is decreased and is then gradually increased after the self reset type protecting device is reset automatically.

The current detector may have current transformers or shunt resistances connected to the output side of the inverter, and determines that the self reset type protecting device has worked when the output of the current transformers has become zero or when the voltage drop across the shunt resistances has become zero.

According to the present invention, the output current of the inverter becomes zero when the self reset type protecting device in the hermetic box has worked. Namely, the current that has become zero is detected by the current detector, and the output of the inverter is decreased to be ready for the reset of the protecting device. After the protecting device is reset, the output voltage is gradually increased to carry out the operation. Therefore, the restarting condition can be established without much increasing the load current of the inverter.

The current transformers or the shunt resistances detect the load current from the inverter to the hermetic box. Therefore, there is no need of particularly drawing the lead wires from the hermetic box for the purpose of detecting current.

DESCRIPTION OF THE PREFERRED EMBODIMENTS

Figure 1:
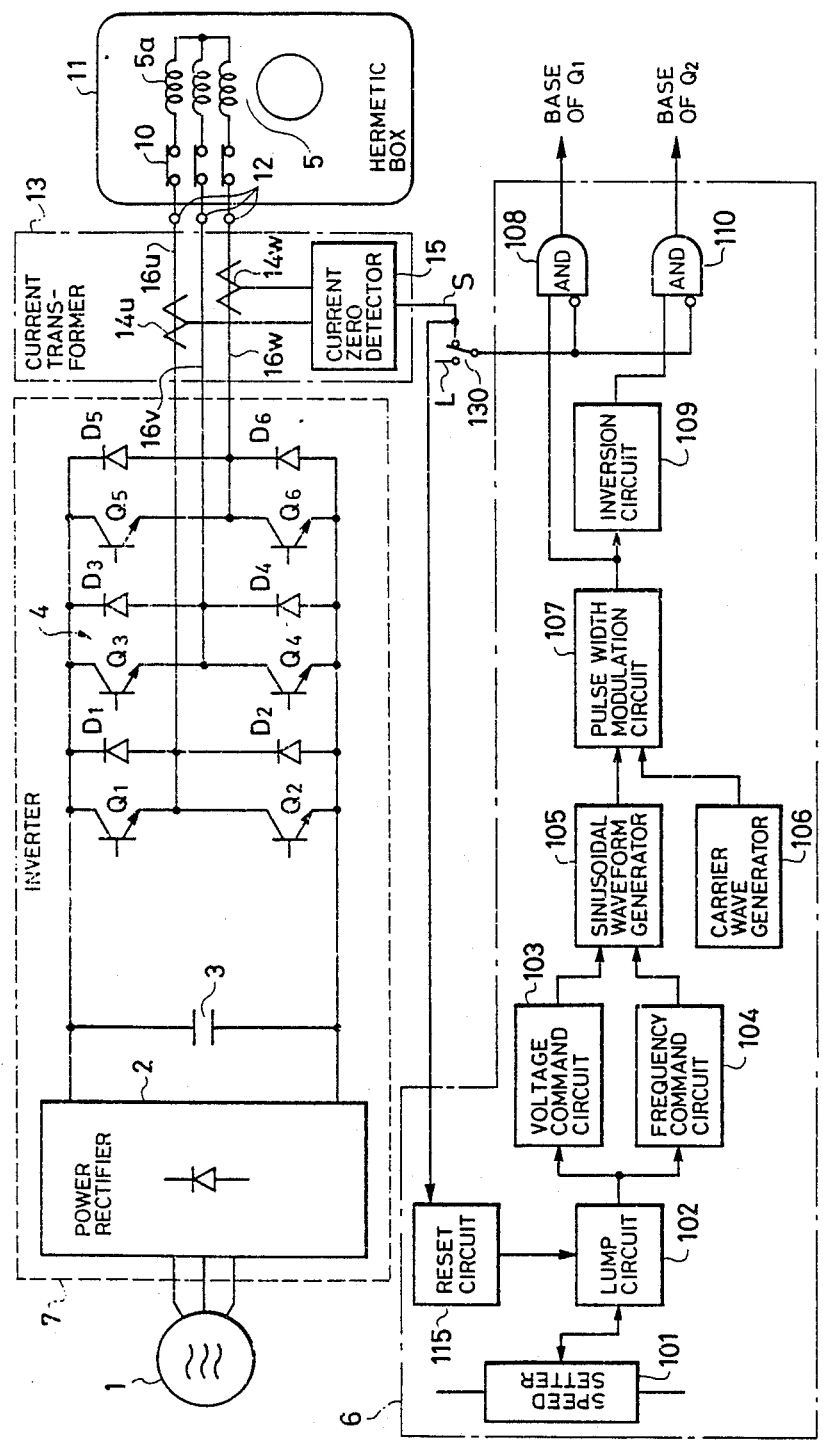
FIG. 1 is a block diagram which illustrates a device according to an embodiment of the present invention.

A first embodiment of the invention will now be described in conjunction with FIG. 1, wherein reference numeral 1 denotes a three-phase AC power source, 2 denotes a power rectifier which rectifies the electric power of the power source 1, reference numeral 3 denotes a capacitor for smoothing the output of the power rectifier 2, and reference numeral 4 denotes a power inverter which receives a DC power smoothed by the capacitor 3, converts it into a three-phase alternating current and supplies it to a motor 5 in a hermetic box 11. The power inverter 4 has main switching transistors $Q_1$ to $Q_6$, and fly-wheel diodes $D_1$ to $D_6$. The inverter is designated generally at 7. In the hermetic box 11 is provided a self reset type protecting device 10 which is connected in series with an armature winding 5a of the motor 5, which interrupts the supply of electric power to the motor 5 when the temperature of the armature winding 5a becomes higher than a predetermined set value, and which resets automatically when the temperature of the armature winding 5a becomes lower than a predetermined set value.

Lead wires 12 are drawn from the hermetic box 11 in a number equal to the number of phases of the armature winding 5a.

A current detector 13 is comprised of two current transformers 14u and 14w, and a current zero detector 15 which produces a signal S that corresponds to "H" of a binary signal only when the outputs of these two current transformers are zero.

The current transformers 14u and 14w are provided on the outside of the hermetic box 11 so as to detect currents of the two output lines 16u and 16w among the three output lines 16u, 16v and 16w of the power inverter 4.

An output controller 6 is constructed as described below.

That is, reference numeral 101 denotes a speed setter for setting the speed of the motor 5, and 102 denotes a lump circuit which softens sudden change in the output of the speed setter.

Reference numeral 103 denotes a voltage command circuit which commands a voltage of a magnitude that meets the output of the lump circuit 102, reference numeral 104 denotes a frequency command circuit which commands a frequency that meets the output of the lump circuit 102, reference numeral 105 denotes a sinusoidal waveform generator which generates sinusoidal waves of a voltage that meets the output of the voltage command circuit 103 and of a frequency that meets the output of the frequency command circuit 104, and reference numeral 106 denotes a carrier wave generator.

Reference numeral 107 denotes a pulse width modulation circuit which compares the output of the sinusoidal waveform generator 105 with the output of the carrier wave generator 106 to modulate the pulse width.

Reference numeral 108 denotes an AND circuit which logically inputs the output of the pulse width modulation circuit 107 and the output of the current detector: the output of the AND circuit 108 serves as a base signal for the main switching transistor $Q_1$.

Reference numeral 109 denotes an inversion circuit for inverting the output of the pulse width modulation circuit 107, and reference numeral 110 denotes an AND circuit which logically inputs the output of the inversion circuit 109 and the output of the current detector 13. The output of the AND circuit 110 serves as a base signal for the main switching transistor $Q_2$.

An automatic switch 130 is provided between the current detector 13 and the AND circuits 108, 110. The switch 130 is connected to the side where a signal corresponding to "L" of the binary signal is produced only at the time of starting the inverter 7, and is then quickly switched to the output side of the current detector after the inverter has started its operation.

Figure 3:
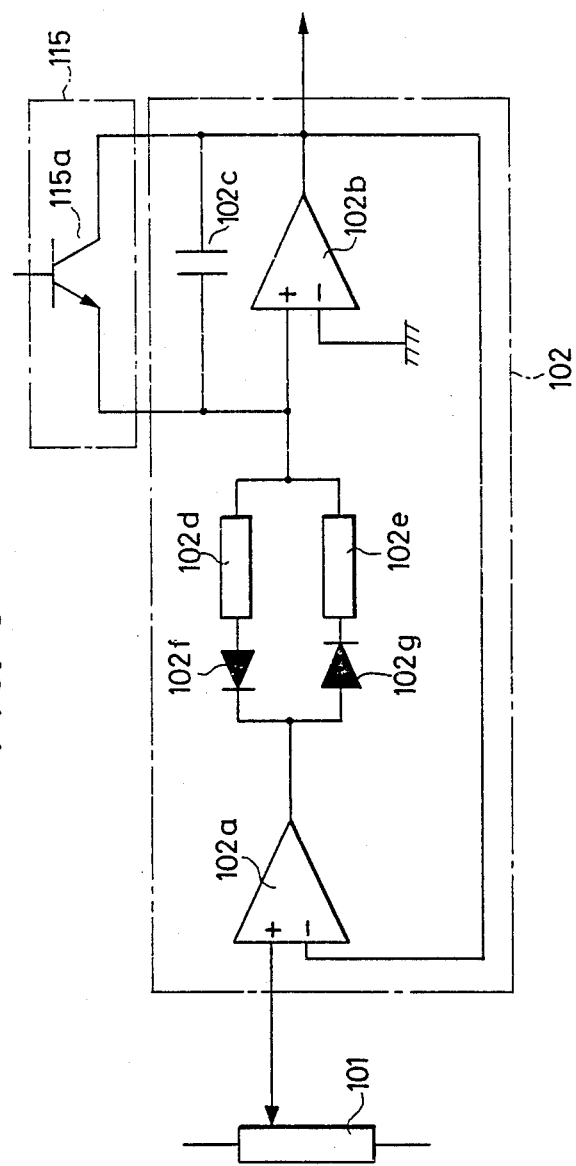
FIG. 3 is a diagram which concretely illustrates circuits of some blocks among the blocks shown in FIGS. 1 and 2.

Reference numeral 115 denotes a reset circuit which sets the output of the lump circuit to the initial value when the current detector 13 has produced a signal that corresponds to "H" of the binary signal, i.e., when the current detector 13 has detected that no current is flowing to the motor 5 and has produced a signal "H". The reset circuit 115 maintains the thus set initial value until a current flows into the motor 5 and the output "L" is produced, and then permits the output to increase gradually after the output "L" is produced. FIG. 3 concretely illustrates the reset circuit 115 and the lump circuit 102. As the signal of the current zero detector 15 assumes the level "H", a transistor 115a is rendered conductive to short-circuit the terminals of a capacitor 102c of an integrating circuit, whereby the electric charge stored in the capacitor 102c is discharged. Reference numerals 102a and 102b denote operational amplifiers, 102d and 102e denote resistors, and 102f and 102g denote diodes.

The output controller 6 is diagramed in one phase thereof only. The sinusoidal waveform generator 105, pulse width modulation circuit 107 andd inversion circuit 109 are provided in a number equal to the number of phases, and the AND circuits 108 and 110 are also provided in a number equal to the number of phases to operate on the respective phase main switching transistors. The three sinusoidal waveform generators 105 are so constituted as to generate sinusoidal waves maintaining a phase difference of $2\pi/3$ in terms of an electric angle.

With the device being constructed as described above, the switch 130 at first is connected to the "L" side. Further, the current detector 13 is producing the output "H" so that the reset circuit 115 sets the output of the lump circuit 102 to the initial value. The output of the lump circuit 102 gradually increases from the initial value up to a value set by the speed setter 101. Therefore, the output frequency andd the output voltage of the inverter 7 gradually increase correspondingly.

As the operation is started, the contact of the switch 130 is automatically switched, so that the output S of the current detector 13 is sent to the AND circuits 108 and 110.

When the temperature of the motor armature winding 5a is lower than a predetermined set value, the contact of the self reset type protecting device 10 is maintained closed. Therefore, the current detector 13 continues to produce the output of the L level. As the temperature of the motor armature winding 5a exceeds a predetermined set value, however, the contact of the self reset type protecting device 10 is opened. Since no current flows into the motor 5, the current detector 13 produces the output S of the "H" level. Therefore, the AND circuits 108 and 110 produce outputs of the "L" level, so that the current to the base of the power inverter main switching transistors is interrupted. Further, the reset circuit 115 works to set the output of the lump circuit 102 to the initial value.

As the contact of the self reset type protecting device 10 closes with the decrease of temperature of the armature winding 5a, the current detector 13 produces the output "L" again to reestablish current to the main switching transistors, and the output of the lump circuit 102 rises gradually. Therefore, the running speed of the motor increases correspondingly.

Figure 2:
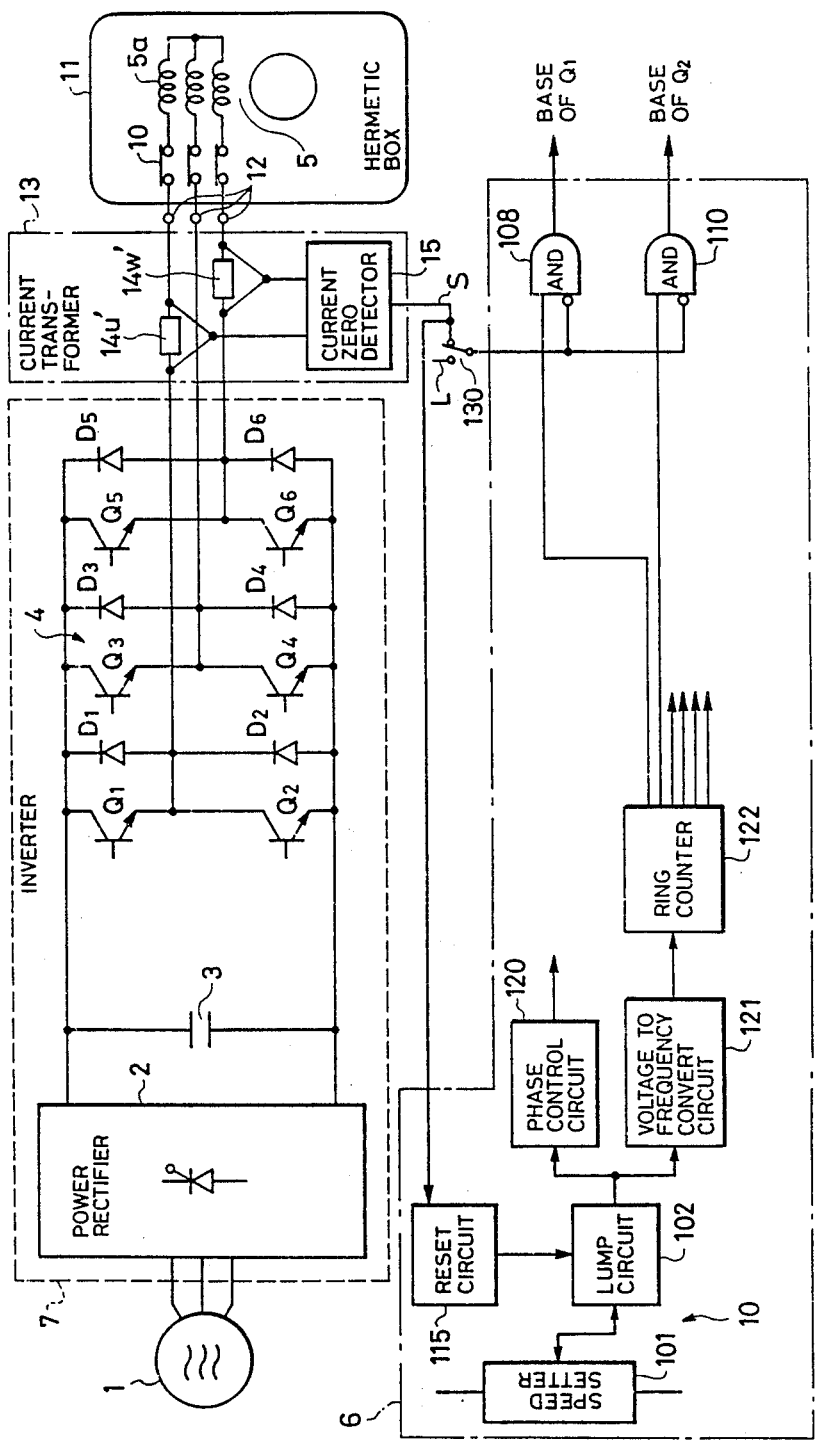
FIG. 2 is a block diagram which illustrates another embodiment of the present invention.

FIG. 2 illustrates another embodiment of the present invention in which the current detector 13 is comprised of shunt resistors 14u', 14w' instead of the current transformers 14u, 14w that are shown in FIG. 1.

According to this embodiment, furthermore, the power rectifier 2 is constituted by a switching element to control the phase. Therefore, provision is made of a phase control circuit 120 which receives the output of the lump circuit 102 to control the phase of the power rectifier 2.

Provision is further made of a voltage-to-frequency converter circuit 121 which receives the output of the lump circuit 102 and generates a frequency that increases with the increase in the output voltage of the lump circuit 102, and a ring counter 122 which receives the output of the converter circuit 121 and distributes the output to produce base signals for the main switching transistors $Q_1$ to $Q_6$. Like that of FIG. 1, the AND circuits 108 and 110 logically operate on the the outputs of the ring counter 122 and the output of the current zero detector 15. AND circuits for the main switching transistors $Q_3$ to $Q_6$ are not shown here.

What we claim is:

1. In a device for energizing a hermetic motor using an inverter, in which lead wires that connect to the motor are drawn from a hermetic box, said hermetic box contains said motor and a self reset type protecting means which interrupts the supply of electric power to said motor when an abnormally heated condition takes place in said hermetic box, and which automatically supplies again the electric power when the abnormally heated condition continues no more, an said motor is energized by the inverter outside said box through AC output terminals connected to said lead wires outside said hermetic box, the improvement which comprises:

current detecting means provided on the output side of said inverter outside of said hermetic box and for detecting that no current is flowing into said motor due to operation of said protecting means interrupting power to said motor;

speed setting means outside said hermetic box for setting the speed of said motor;

lump circuit means responsive to the output of said speed setting means for producing a correlated control output;

inverter output control means for controlling said inverter so to produce an output voltage and an output frequency that correspond to the output of said lump circuit; and reset means for causing said lump circuit means to decrease its output in response to said current detecting means detecting that no current is flowing into said motor and thereby producing a corresponding control of said control means to decrease inverter power output when said protecting means resets.

2. A device for energizing a hermetic motor according to claim 1, wherein said current detecting means has current transformers connected to the output side of said inverter.

3. A device for energizing a hermetic motor according to claim 1, wherein said current detecting means has shunt resistances connected to the output side of said inverter.

4. A device for energizing a hermetic motor according to claim 1, wherein said output control means decreases the output voltage of said inverter when said current detecting means has detected that said protecting means has interrupted power to said motor, and then gradually increases said output after said protecting means resets.

5. A device for energizing a hermetic motor according to claim 1, wherein said output control means decreases the output voltage and the output frequency of said inverter when said current detecting means has detected that said protecting means has interrupted power to said motor, and then gradually increases said output voltage and said output frequency after said protecting means resets.

6. A device for energizing a hermetic motor using an inverter according to claim 1, wherein said reset means resets the output of said lump circuit to an initial value corresponding to the normal starting operation, when said current detecting means has detected that no current is flowing into said motor.

* * * * *